July 23, 1957     E. F. MOGREN     2,799,962
TELLTALE DEVICE

Filed June 25, 1954                                  2 Sheets-Sheet 1

INVENTOR
Eben F. Mogren
BY
ATTORNEY

United States Patent Office 2,799,962
Patented July 23, 1957

2,799,962

TELLTALE DEVICE

Eben F. Mogren, Weaver, Minn.

Application June 25, 1954, Serial No. 439,366

9 Claims. (Cl. 43—17)

This invention relates to an improvement in tell tale device for fishermen and deals particularly with a signal useful in advising a fisherman when a fish has been caught. During recent years the sport of ice fishing has increased enormously in popularity. One of the disadvantages of such fishing lies in the fact that the fisherman is usually subjected to extremely low temperatures during the fishing period. Occasionally the fisherman is provided with a warming house equipped with a small portable stove to which the fisherman may go for relief from the cold. However, these devices are usually provided with windows and, accordingly, it is difficult for the fisherman to remain enclosed for any great period of time as a fish which takes the bait in the meantime might well escape.

Tell tale devices have been provided which are sometimes constructed in the form of a cross and including a vertical mast and a horizontal support designed to bridge the opening in the ice. The vertical mast extends above and below the support and is provided at its lower end with an inexpensive reel. This portion of the mast extends into the water and movement of the mast tends to keep the opening free of ice. The upper portion of the mast is provided with a strip of spring metal which is bent into a loop and hooked onto a fixed member on the mast. A rod is pivotally supported by the mast extending vertically thereof and has a lower end which is bent angularly to engage a lug on the periphery of the wheel. The upper end of this rod is bent so as to extend on either side of the spring metal strip and it is engaged to the fixed shoulder. When a sufficient pull is exerted upon the line, the reel tends to rotate urging the lug on the reel against the angularly extending arm at the lower end of the rod and pivoting this rod. Pivotal movement of the rod causes the upper end of the rod to force the spring steel strip off from its retaining shoulder so that the spring steel strip will swing into erect position. A small flag is usually provided on the strip so that the position of it may be more easily seen. In other words, when the trigger is released, the spring steel strip swings upwardly and provides an indication to the fisherman that a pull is being exerted upon the line.

The present invention incorporates a similar tell tale arrangement but also provides a switch which is actuated by actuation of the spring steel strip. Accordingly, when the strip is disengaged from its retaining member, the switch is actuated to close the circuit. This circuit is arranged in series with a light or bell which may be adjoining the apparatus or may be remotely located. In any event operation of the device sounds a suitable alarm which gives notice to the fisherman that a fish is on the line. If desired, a series of such devices may be arranged in the circuit so that the operation of several such devices will sound the alarm.

A further feature of the present invention lies in incorporating a switch arm on a tell tale device which is pivotally supported by the mast thereof and which is movable from a position in which a circuit is open to a circuit closing position. This switch arm includes a plate which is mounted in the path of movement of the spring steel strip when it swings from bode position to upright position. Accordingly, the switch arm is actuated by the tell tale device and both devices operate simultaneously.

These and other objects and novel features of my invention will be more clearly and fully set forth in the following specification and claims.

In the drawings forming a part of the specification:

Figure 1:
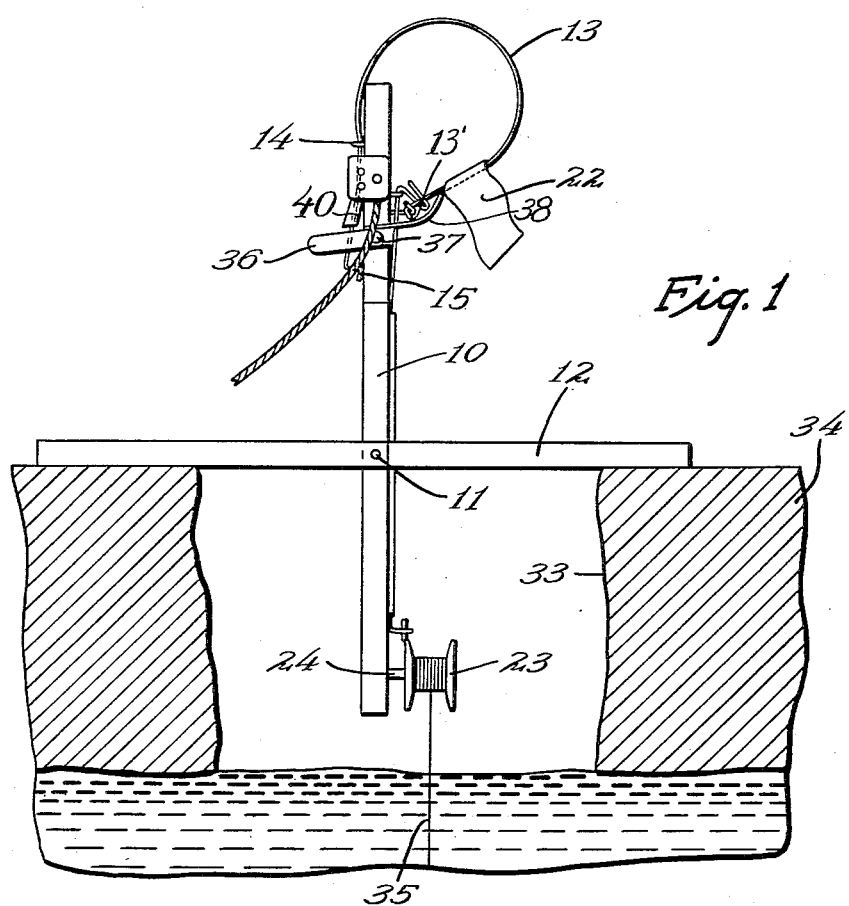
Figure 1 is a side elevational view of a tell tale device supported in position for operation.

In general the device includes a mast 10 which is pivotally connected at 11 between a pair of parallel cross members 12. The cross members 12 are pivotally connected to the mast so that the two parts may be swung toward side by side relation when the device is not in use.

A spring metal strip 13 is slidably supported to the mast by one or more screw eyes or staples 14. This spring strip 14 is shown at an angularly bent offset end 15 which may bear against the mast with more and more tension as the spring steel strip is moved upwardly. The purpose of slidably supporting the strip is to permit the strip to collapse against the mast or be retracted when the device is not in use. The offset end 15 bends the portion of the strip below the guiding eye 14 and holds the strip in projected position when the device is being used.

Figure 3:
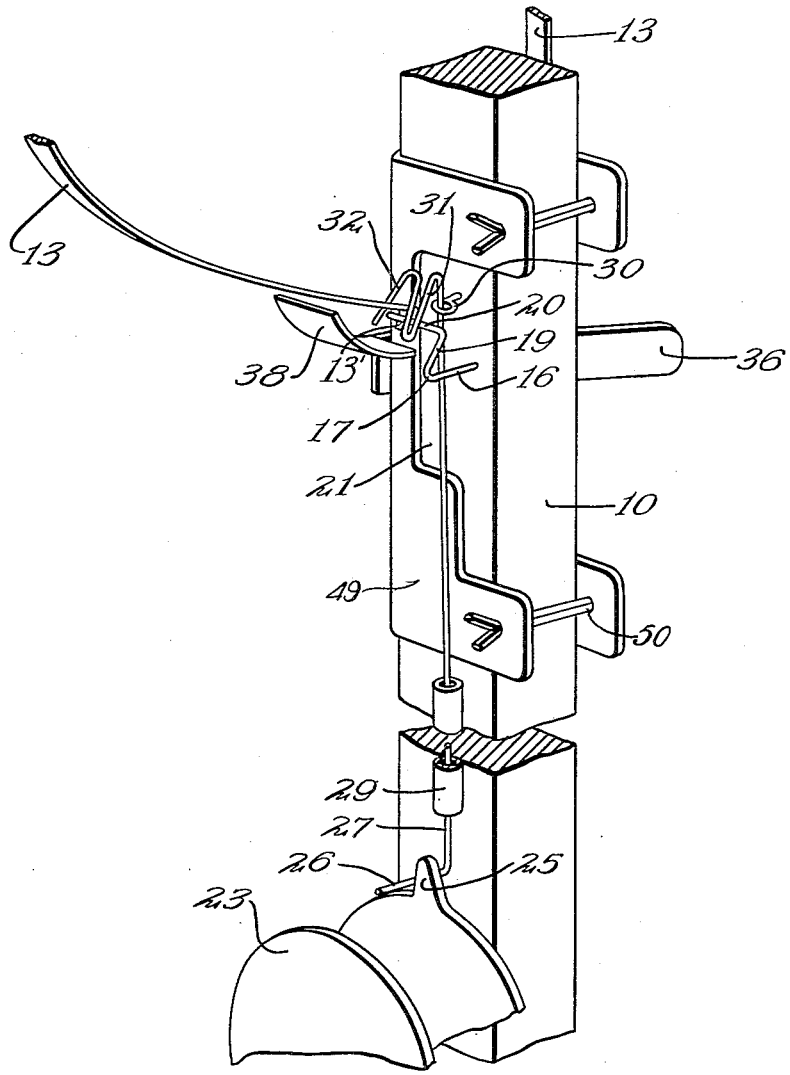
Figure 3 is a perspective fragmentary view of the operating portion of the apparatus showing in general the arrangement of parts therein.

As is best shown in Figure 3 of the drawings the mast is provided with a fixed projection 16 which extends at right angles to the mast outwardly for a short distance and then is then bent at 17 to extend upwardly and toward the body of the mast 10. The upwardly inclined portion 19 terminates in a right angularly extending end 20 which extends generally parallel to the surface 21 of the mast which it overlays. This right angularly extending end 20 forms a shoulder over which the hook shaped end 13' of the strip 13 may engage. When this hook end 13' is engaged with the shoulder or retainer 20, the strip 13 is held in bode position. As shown in Figure 1, a small piece of cloth 22 may be provided near the end of the steel strip so as to act as a signal flag.

An inexpensive reel 23 is pivotally supported at 24 to the side of the mast 10 which has been designated by the numeral 21. As shown in Figure 3, the reel 23 is provided with a projection 25 which extends beyond the periphery of the reel. This projection 25 is engageable against the right angularly turned extremity 26 of a trigger 27.

The trigger arm 27 extends through a tubular support 29 extending vertically along the mast 10. The rod 27 is guided near its upper end by a screw eye 30 through which it extends. The arm 27 is bent outwardly and downwardly at 31, and is reversely bent to provide a V-shaped trigger portion 32 which is sufficiently wide to accommodate the spring strip 13 between the sides of the V-shaped portion.

When the mast 10 is projecting into a hole 33 in the ice 34, the line 35 wound upon the reel 23 brings the projection 25 against the trigger arm end 26. When a pull is exerted on the line 35, the projection 25 bears against the arm end 26, pivoting the arm 27 including the V-shaped portion 32. This rotation acts to slide the strip 13 off the end of the member 20, permitting the strip 13 to spring into upright position.

A switch lever arm 36 is pivoted to a switch supporting bracket by a pivot 37. The lever arm 36 is provided with a curved bearing plate 38 which is pivotal into and out of the path of movement of the hook end 22 of the spring strip 13 as this hook end becomes disengaged from the member 20, as will be later described.

Figure 2:
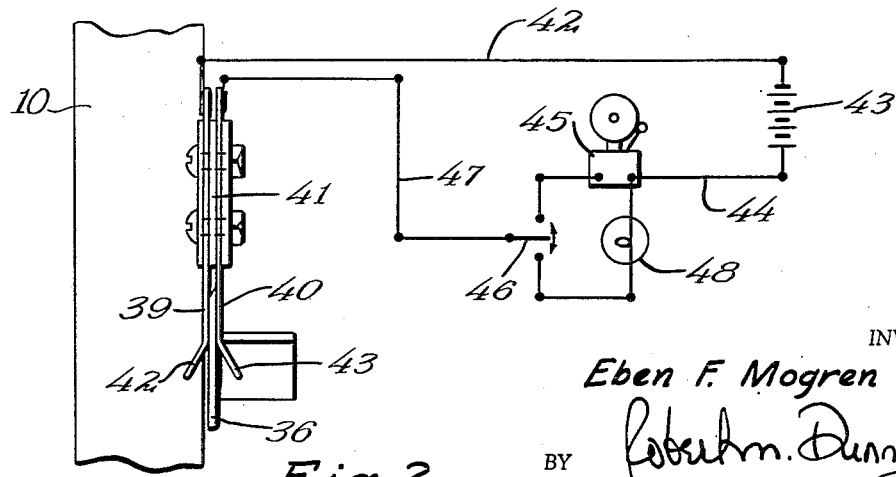
Figure 2 is an elevational view of a detail portion of the device showing an alarm circuit diagrammatically connected thereto.

A switch is supported on the switch supporting bracket, this switch including contact arms 39 and 40 spaced by insulation 41. The free ends 42 and 43 of the switch contact arms 39 and 40 diverge apart as shown in Figure 2 so that the end of switch arm 36 may pivot between these blades. The lever arm 36 is wholly or partly formed of conductive material so as to form a contact between the blades 39 and 40 in one position of the arm 36.

The blade 39 is connected by conductor 42 to a source of current such as the battery 43. The other battery terminal is connected by conductor 44 to terminals of a signal bell 45 and signal light 48. The other signal terminals are connected through a switch 46 to a conductor 47 leading to switch contact blade 40. The switch 46 is shown arranged to selectively connect the signal bell or signal light in series with the current supply when the switch lever arm 36 is bridging the contacts 39 and 40. Obviously, however, both signals may function simultaneously if preferred, or either may be omitted.

The switch supporting bracket 49 is channel shaped to fit about the mast 10, being held in place by bolts or keys 50. Thus, my switch may be added to a telltale of usual construction by merely mounting the bracket 49 on the mast.

In operation, one or a series of masts may be used, and may function to operate a common signal or a selected signal. Each mast is similarly supported, with a line 35 depending from its reel 23. The switch lever arm 36 is pivoted into the position shown in Figure 1 and 3, with the bearing plate 38 thereof in the path of movement of the end 22 of the spring strip 13.

When a pull is exerted on a line 35, the reel projection 25 pivots the trigger arm 27. The hook end 22 of each spring strip 13 has been hooked over the fixed retaining member 20, the V-shaped guide straddling the strip. The pull upon the line pivots the V-shaped guide 32, sliding the hook end 22 off the end of the member 20. The spring of the strip 13 then swings the free end of the strip into upright position.

As the spring strip is unhooked, the free end 22 strikes against the bearing plate 38 of the lever 36, pivoting this lever in a clockwise direction as viewed in Figure 1. This closes the alarm circuit (the manual switch 46 having been previously closed). The alarm continues until the lever arm 36 is swung from between the contact blades 39 and 40.

The cooperative relationship of the signal 45 will be apparent from the position of lever arm 36 on post 10, shown in Figure 1, relative to parallel blades 39 and 40, as shown in Figure 2. The wiring diagram of Figure 2 is shown more conveniently in detail with the pivotal lever 36 and blades 39 and 40, than can be clearly illustrated in Figures 1 and 3. It will be understood that the fish line operated mechanism may be at one point and the signal at a remote point.

In accordance with the patent statutes, the principles of construction and operation of my telltale device have been described and while it has been endeavored to set forth the best embodiments thereof, it is desired to have it understood that obvious changes may be made within the scope of the following claims without departing from the spirit of the present invention.

I claim:

1. A telltale for fishermen including in combination a flexible switch actuating spring strip having a movable end, a mast supporting said strip to extend upwardly therefrom in one position, catch means engageable with the movable end of the strip and holding said strip flexed into a loop, fish line actuated means pivotally engageable with said strip to disengage the same from said catch means, switch means, and a switch lever pivotally supported by said mast and pivotal into and out of the path of movement of the movable end of the spring strip, said switch lever actuating said switch means upon release of said movable end of the spring strip from said catch means and upon pivotal movement of said switch lever into and out of the path of movement of said movable strip end.

2. A telltale for a fish line including in combination a mast, a fish line support connected to said mast, a spring strip having one end connected to said mast and having a switch actuating movable end, a member with which said movable end is secured to hold said strip bent out of normal position, trigger means associated with said line support and said movable end of said spring strip to disengage said movable end from said member when a pull is exerted upon the fish line, a switch arm pivotally supported by said mast adjacent said trigger means associated with said movable end of said spring strip, spring strip bearing means on said switch arm engageable with said spring strip and positionable in the path of movement of said movable end of said spring strip traced as the strip flexes from bent position to normal position, and switch contacts actuated by the pivoting of said switch arm as the said bearing means of said switch arm is engaged by the movable end of said spring strip.

3. The structure described in claim 2 including a circuit and audible signal means and in which the switch contacts function to close said circuit when said switch arm is out of path of movement of said free end of said spring strip.

4. The structure described in claim 2 and in which the switch contacts are spaced, and the switch arm is electrically conductive and extends between said contacts in contact therewith.

5. The structure described in claim 2 and in which the means on the switch arm comprises a plate against which the free end of the spring strip may strike.

6. A telltale for fishermen including in combination a mast, a rotatable reel supported by said mast, a fishing line connected to said reel, a trigger arm having an angularly extending end supported adjacent to said reel, means on said reel engaging said arm end upon rotation of said reel, means rotatably supporting said trigger arm to extend longitudinally of said mast, a spring strip connected at one end to said mast, said spring strip having a switch actuating movable end, releasable holding means on said mast with which said movable strip end may engage to hold said spring strip flexed, release means on said trigger arm engageable with said movable strip end to disengage the same from said means on said mast; a switch, and a switch arm including upwardly curved lever means mounted in the path of movement of the said movable strip end to actuate said switch.

7. The construction described in claim 6 and in which the upwardly curved lever means mounted in the path of movement of the said movable strip end comprises a bearing plate.

8. The construction described in claim 6 and in which the switch comprises a pair of spaced contacts between which said switch arm may engage and contact, the switch arm being comprised of electrically conductive material.

9. A telltale for fishermen including in combination a mast, an elongated resilient member having one end secured to said mast and a transversely slidable and releasable end, releasable securing means engaging said slidable and releasable end for releasably holding said resilient member flexed out of its normal position, an electrically operable signal, pivotal lever means actuated by said resilient member for simultaneously activating said electrically operable signal upon release of said end engaging means, a fish line support on said mast supporting a fish line thereon, and trigger means actuated by a pull on said fish line and engageable with said slidable and releasable end of said resilient member to transversely slide and release the same.

References Cited in the file of this patent

UNITED STATES PATENTS

| | | |
|---|---|---|
| 1,521,016 | Forshee | Dec. 30, 1924 |
| 2,032,537 | Kozikowski | Mar. 3, 1936 |
| 2,170,000 | Eggleston | Aug. 22, 1939 |
| 2,518,517 | Baulski | Aug. 15, 1950 |
| 2,651,875 | Brockman | Sept. 15, 1953 |